(12) United States Patent
Soryal

(10) Patent No.: US 12,038,943 B2
(45) Date of Patent: Jul. 16, 2024

(54) MACHINE LEARNING-BASED DATA SET PROFILING AND VISUALIZATION

(71) Applicant: AT&T Intellectual Property I, L.P., Atlanta, GA (US)

(72) Inventor: Joseph Soryal, Glendale, NY (US)

(73) Assignee: AT&T Intellect al Property I, L.P., Atlanta, GA (US)

( * ) Notice: Subject to any disclaimer, the term of this patent is extended or adjusted under 35 U.S.C. 154(b) by 75 days.

(21) Appl. No.: 17/859,501

(22) Filed: Jul. 7, 2022

(65) Prior Publication Data

US 2024/0012832 A1 Jan. 11, 2024

(51) Int. Cl.
G06F 16/26 (2019.01)
G06F 16/22 (2019.01)

(52) U.S. Cl.
CPC .......... G06F 16/26 (2019.01); G06F 16/2272 (2019.01)

(58) Field of Classification Search
CPC .............................. G06F 16/26; G06F 16/2272
See application file for complete search history.

(56) References Cited

U.S. PATENT DOCUMENTS

| 2017/0329804 | A1* | 11/2017 | Fu | G06F 18/214 |
| 2018/0210929 | A1* | 7/2018 | Mukherjee | G06F 16/26 |
| 2020/0004864 | A1* | 1/2020 | Hussam | G06F 16/438 |

OTHER PUBLICATIONS

Reed, S., et al., "Generative Adversarial Text to Image Synthesis, Proceedings of the 33rd International Conference on Machine Learning", New York, 2016, 10 pages.
Nguyen, A., et al., "Plug & Play Generative Networks: Conditional Iterative Generation of Images in Latent Space", Apr. 17, 2017, arXiv:1612.00005v2, 36 pages.
Zhou, Y., et al., "LAFITE: Towards Language-Free Training for Text-to-Image Generation", accessed Jun. 28, 2022 from C3-ZHOU-LAFITE-Towards-Language-Free, 17 pages.
Nair, D., et al., A Beginners Guide to Exploratory Data Analysis:, Analytics Vidhya Medium, Feb. 24, 2021, accessed from https://medium.com/analytics-vidhya/a-beginners-guide-to-exploratory-data-analysis-eda-c96b780f744d.
Rönnbäck, L., et al., "Anchor Modeling", Oct. 5, 2010, accessed from https://www.anchormodeling.com/wp-content/uploads/2011/05/Anchor-Modeling.pdf, 31 pages.
Varatharahah, A., "Automated Data Profiling Using Python", Towards Data Science, Jun. 10, 2019, accessed from https://towardsdatascience.com/automated-data-profiling-99523e51048e?gi=6ddc1c9d2d5a, 12 pages.

(Continued)

*Primary Examiner* — Grace Park

(57) ABSTRACT

A processing system may obtain at least a first data object of a data set and obtain a profile of the at least the first data object, where the profile defines at least one property of the first data object and at least one relationship between the at least the first data object and at least a second data object of the data set. The processing system may then select at least a first component of a visual object for the at least the first data object based upon the at least one property and the at least one relationship, label the at least the first component of the visual object in accordance with the at least the first data object, in response to the selecting, and present the visual object with the at least the first component labeled in accordance with the at least the first data object.

20 Claims, 4 Drawing Sheets

(56) References Cited

OTHER PUBLICATIONS

Williams, D., "Five steps to tackle big graph data visualization", Cambridge Intelligence, Sep. 21, 208, accessed from *Big graph data visualization: Five steps to large-scale visual graph analysis* (cambridge-intelligence.com), 10 pages.

Marelli, F., "Build an automatic data profiling and reporting solution with Amazon EMR, AWS Glue, and Amazon QuickSight", AWS Big Data Blog, May 13, 2020, accessed from https://aws.amazon.com/blogs/big-data/build-an-automatic-data-profiling-and-reporting-solution-with-amazon-emr-aws-glue-and-amazon-quicksight/, 43 pages.

IBM Documentation, "Classifying an asset according to its data", InfoSphere Information Server, V. 11.3, Feb. 28, 2021, accessed from *Classifying an asset according to its data—IBM Documentation*, 5 pages.

IBM Documentation, "Data classification", InfoSphere Information Server, V. 11.3, Feb. 28, 2021, accessed from *Data classification—IBM Documentation*, 4 pages.

IBM Documentation, "Identifying keys and analyzing relationships", InfoSphere Information Server, V. 11.3, Feb. 28, 2021, accessed from Identifying keys and analyzing relationships—IBM Documentation, 3 pages.

IBM Developer, "Introduction to big data classification and architecture", Sep. 17, 2013, accessed from *Introduction to big data classification and architecture—IBM Developer*, 11 pages.

Alawini, A., et al., "Towards Automated Prediction of Relationship Among Scientific Datasets", accessed on Jun. 28, 2022 from https://www.sdsc.edu/Events/ssdbm2015/day1/short%20papers/SP-3_Alawini-towardsAutomatedPredictionOfRelationshipsAmongScientificDatasets_Alawini.pdf, 29 pages.

Figure 4 from Deters, Harmen & Timm, Wiebke & Nattkemper, Tim. (2006). "REEFSOM—A Metaphoric Data Display for Exploratory Data Mining. Brains, Minds & Media", accessed https://www.researchgate.net/publication/26626434_REEFSOM_-A_Metaphoric_Data_Display_for_Exploratory_Data_Mining/citation/download on Jun. 27, 2022, 1 page.

\* cited by examiner

MACHINE LEARNING-BASED DATA SET PROFILING AND VISUALIZATION

The present disclosure relates generally to telecommunication network database records management and utilization, and more particularly to methods, computer-readable media, and apparatuses for presenting a visual object with components labeled with data objects of a data set.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
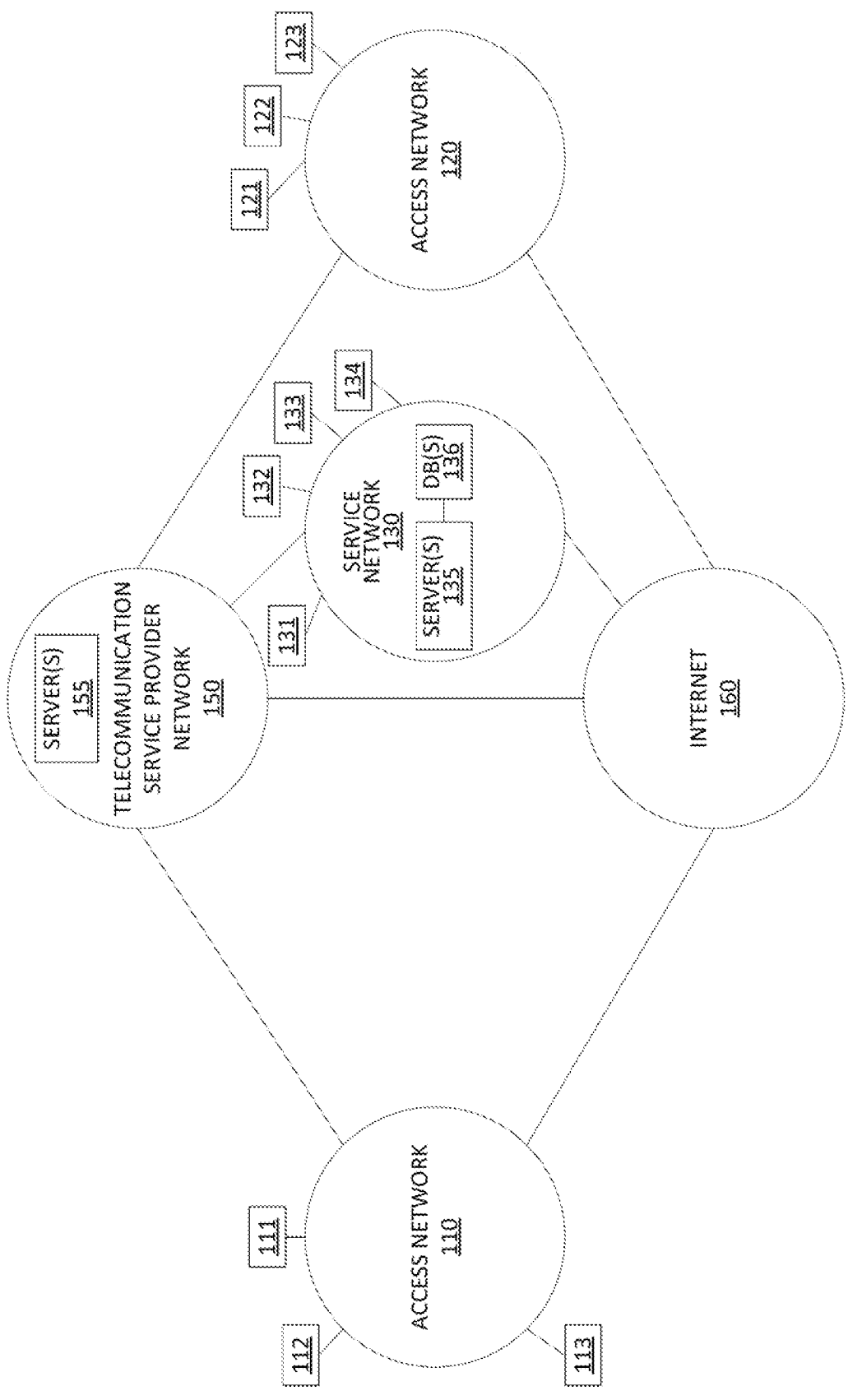
FIG. 1 illustrates one example of a system including a telecommunication network, according to the present disclosure.

The present disclosure broadly discloses methods, non-transitory (i.e., tangible or physical) computer-readable media, and apparatuses for presenting a visual object with components labeled with data objects of a data set. For instance, in one example, a processing system including at least one processor may obtain at least a first data object of a data set and obtain a profile of the at least the first data object, where the profile defines at least one property of the first data object and at least one relationship between the at least the first data object and at least a second data object of the data set. The processing system may then select at least a first component of a visual object for the at least the first data object based upon the at least one property and the at least one relationship, label the at least the first component of the visual object in accordance with the at least the first data object, in response to the selecting, and present the visual object with the at least the first component labeled in accordance with the at least the first data object.

Data scientists may spend considerable time trying to familiarize themselves with new data sources. Many organizations are affected by this problem, especially large organizations with many different data sets and legacy systems. For example, data analysts, such as business intelligence personnel, data engineers, and other data scientists, may spend a substantial amount of time in meetings, sending e-mails, and making phone calls to colleagues trying to figure out what information the data sources contain, the limitations of the data sources, how to operate on the data sources, the schemas of the data sources, and so forth. In particular, data administrators may change over time, and the user base of various data sources may also change as personnel retire or move on to different projects, different roles, or different organizations. Moreover, the amount of data collected for various purposes, such as in a large telecommunication network, is becoming enormous. In addition, tying data from various sources together to generate meaningful insights is challenging, given that many big data systems may employ distributed data profiling and/or distributed data processing pipelines, where the data processed in separate hardware systems is rejoined for unification of the results (meaningful insights) at the end.

Examples of the present disclosure enhance the process of tying data objects together in a visual manner that is easy for human understanding and that may further supplement machine-understandable data associations. In particular, examples of the present disclosure automatically generate an annotated visual object that represent a data set composed of multiple interrelated data objects. For example, the present disclosure may generate an abstract visual representation of a data set comprising a visual object and annotations in accordance with data objects of the data set. For instance, the visual object may comprise a connected element, such as a tree with a trunk, branches, leaves, roots, etc., a bicycle with wheels, a frame, handlebars, etc., and so forth. In each case, a data object is represented as a component, e.g., an element or feature, of the visual object. In addition, relationships between data objects may be represented by the components' associations to each other in the visual object, as described in greater detail below.

An abstract visual representation may make it easier for humans to quickly understand the data objects and their correlations and relative functionality with other data objects in a data set. In addition, as more abstract visual representations are generated, this may also enhance and make more efficient the further processing of new data objects and generation of subsequent abstract visual representations. For instance, a library may be comprised of abstract visual representations, and information of associated data sets represented by such abstract visual representations. The library may be used for further generation of abstract visual representations for new data sets, and/or for updating data sets with new data objects.

In accordance with the present disclosure, a visual object may comprise a static image, which can including photographs, cartoons or other artworks, etc. Alternatively, or in addition, a visual object may comprise an animated/dynamic visual object, such as an animated Graphics Interchange Format (.gif) file, or the like. Visual objects may be of various categories, such as machinery/mechanical systems, which may be further divided into sub-categories of transportation systems/vehicles, appliances, exercise equipment, etc., landscape items, which may be divided into sub-categories of plants, landscapes/panoramas, etc., and so forth.

In one example, the present disclosure may comprise a module, which may be referred to as a descriptive classifier (DC), which may operate on top of or concurrently with an existing classifier, or classifiers, e.g., one or more data profiling processes. In one example, the descriptive classifier may obtain profiles of data objects in a data set, and may form a meaningful visual representation of the data set being classified. In particular, the descriptive classifier may select and/or generate a visual object with multiple components. For instance, the visual object may form the basis of an abstract representation of the data set, and may comprise, for example, a car, a bicycle, a butterfly, a tiger, an airplane with contrail, a helicopter, a landscape with mountain range and lake, and so forth.

In one example, a visual object may be selected for an abstract representation of a data set based upon a measure of similarly between a subject data set and another data set for which the visual object has already been used for an abstract representation. For instance, a user may have manually generated an abstract representation for a first data set using a four-wheeled vehicle after determining that a four-wheeled vehicle may represent the data set. For instance, functionality of components, positions of components, number of components, the overall shape, or other components/features of the four-wheeled vehicle may be considered to provide an informative abstract representation of the first data set (e.g., the data objects of the first data set). Subsequently, if a second data set is determined to share a significant number of characteristics/properties with the first data set, then a four-wheeled vehicles may again be selected, e.g., automatically by the descriptive classifier, for representing the second data set.

In one example, a data object, and the profile (e.g., the characteristics) thereof may be represented by a component in the visual object. In addition, the relative relation between a specific component and other components of the visual object may represent the relationship between a data object and one or more other data objects in the data set. For instance, fixed data can be represented by a vehicle body, variable/dynamic data may be represented by the wheels (e.g., each wheel may represent a different data object that contains variable/dynamic data), etc. As such, the data objects of the data set, and the profiles (e.g., characteristics) of the data objects are analogized to the selected visual object and its components. In one example, the descriptive classifier may label the component(s) of the visual object with the associated data object(s). In addition, in one example, the descriptive classifier may further label component(s) of the visual object (and/or a portion of the visual object linking two components) with a relationship between two associated data objects.

In one example, the present disclosure may provide a unified data view (in a distributed architecture) so as to provide a same vision (reference) when distributed hardware entities perform extract, transform, and load (ETL) operations on the data, e.g., to aggregate, sanitize, clean, etc. Examples of the present disclosure also provide for more efficient classification and other machine learning processes on ingested data. While the present examples may initially utilize significant compute resources, such requirements may be drastically reduced after an initial visual object model/reference is built up. These and other aspects of the present disclosure are described in greater detail below in connection with the examples of FIGS. 1-4.

To aid in understanding the present disclosure, FIG. 1 illustrates an example system 100 comprising a plurality of different networks in which examples of the present disclosure may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed-mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing device or processing system, such as computing system 400 depicted in FIG. 4, and may be configured to host one or more centralized and/or distributed system components. For example, a first system component may comprise a database of assigned telephone numbers, a second system component may comprise a database of basic customer account information for all or a portion of the customers/subscribers of the telecommunication service provider network 150, a third system component may comprise a cellular network service home location register (HLR), e.g., with current serving base station information of various subscribers, and so forth. Other system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other system components may include, for example, a layer 3 router, a short message service (SMS) server, a voicemail server, a video-on-demand server, a server for network traffic analysis, and so forth. It should be noted that in one example, a system component may be hosted on a single server, while in another example, a system component may be hosted on multiple servers in a same or in different data centers or the like, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user/subscriber devices. In addition, in one example, any of the endpoint devices 111-113 and 121-123 may comprise a device of an end-user (e.g., of an abstract data visualization service, as referred to herein).

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may comprise a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, an Internet Protocol private branch exchange (IPPBX), and so forth, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed.

In one example, the service network 130 links one or more devices 131-134 with each other and with Internet 160, telecommunication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the telecommunication service provider network 150, devices 131-134 of the service network 130 may comprise devices of network personnel, such as customer service agents, sales agents, marketing personnel, or other employees or representatives who are tasked with addressing customer-facing issues and/or personnel for network maintenance, network repair, construction planning, and so forth. Similarly, devices 131-134 of the service network 130 may comprise devices of network personnel responsible for operating and/or maintaining an abstract data visualization platform, or processing system.

In the example of FIG. 1, service network 130 may include one or more servers 135 which may each comprise all or a portion of a computing device or processing system, such as computing system 400, and/or a hardware processor element 402 as described in connection with FIG. 4 below, specifically configured to perform various steps, functions, and/or operations for presenting a visual object with components labeled with data objects of a data set, as described herein. For example, one of the server(s) 135, or a plurality of servers 135 collectively, may perform operations in connection with the example method 300 of FIG. 3, or as otherwise described herein. Similarly, one or more of the server(s) 135 may represent an abstract data visualization platform or processing system. In other words, one or more of the server(s) 135 may provide an automated abstract data visualization service.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, service network 130 may also include one or more databases (DBs) 136, e.g., data repositories comprising physical storage devices integrated with server(s) 135 (e.g., database servers), attached or coupled to the server(s) 135, and/or in remote communication with server(s) 135 to store various types of information in support of examples of the present disclosure for presenting a visual object with components labeled with data objects of a data set. As just one example, DB(s) 136 may be configured to receive and store network operational data collected from the telecommunication service provider network 150, such as call logs, mobile device location data, control plane signaling and/or session management messages, data traffic volume records, call detail records (CDRs), error reports, network impairment records, performance logs, alarm data, television usage information, such as live television viewing, on-demand viewing, etc., and other information and statistics.

In accordance with the present disclosure, a data set may comprise a number of data objects selected from data of these data sources (e.g., at least a portion of the records from each of these data sources). For instance, in the case of mobile device location data, new location data is continuously collected by the telecommunication service provider network 150. This data may be added as new records to DB(s) 136 on an ongoing basis, e.g., hourly, daily, etc. In addition old mobile device location data records may be released from DB(s) 136 on an ongoing basis and/or may be aggregated, averaged, etc., and stored as new data in DB(s) 136. Thus, for purposes of the present disclosure a data object may comprise at least a portion of the data from one of these sources, e.g., all currently available records, currently available records for a given time interval (e.g., where multiple data objects may be associated with different time intervals of available data from a same source), and so forth. In this regard, it should be noted that a data object may comprise a data table, a data vector, and/or a column of data. In one example, a data set may comprise a plurality of data tables (e.g., data objects) that may have defined relationships, or which may have unknown/undefined relationships. In one example, relationships may be learned via ETL and/or automated data profiling operations in accordance with the present disclosure, and added to the respective data object and/or data sets as metadata (e.g., as part of a data object or data set "profile"). Alternatively, or in addition, a data set may comprise a data table having a plurality of data objects (e.g., columns, rows/sets of rows, etc.).

In one example, a data object may comprise all or a portion of a graph database, where other data objects in a data set may comprise other portions of the graph database, different graph databases, data tables that are referenced by nodes of the graph database, and so forth. In this regard, it should be noted that the present disclosure is not limited to any particular type of database/data storage platform or system, but may apply to various types of structured query language (SQL) and no-SQL database systems, graph databases, and so forth.

In one example, data from server(s) 155 may be further compiled and processed, e.g., normalized, transformed, tagged, etc. (e.g., extract, transform, and load (ETL) processing) for storage as further data objects within DB(s) 136. In one example, data objects may be further organized into one or more data sets via an ETL process, such as in accordance with a system operator configuration that defines ownership and/or other associations of data objects to data sets. In one example, a data object may belong to more than one data set. In another example, a data object may be replicated such that different data sets have respective copies of the data object. In one example, network operational data may further include data and/or records collected from access networks 110 and 120 (e.g., where access networks 110 and 120 are a part of and/or controlled by telecommunication service provider network 150), such as from cellular base station equipment, data reported by and collected from endpoint devices 111-113 and 121-123, or the like, and so forth.

In one example, DB(s) 136 may be configured to receive and store records from customer, user, and/or subscriber interactions, e.g., with customer facing automated systems and/or personnel of a telecommunication network service provider or other entities associated with the service network 130. For instance, DB(s) 136 may maintain call logs and information relating to customer communications which may be handled by customer agents via one or more of the devices 131-134. For instance, the communications may comprise voice calls, online chats, etc., and may be received by customer agents at devices 131-134 from one or more of devices 111-113, 121-123, etc. The records may include the times of such communications, the start and end times and/or durations of such communications, the touchpoints traversed in a customer service flow, results of customer surveys following such communications, any items or services purchased, the number of communications from each user, the type(s) of device(s) from which such communications are initiated, the phone number(s), IP address(es), etc. associated with the customer communications, the issue or issues for which each communication was made, etc. For instance, there may be different data objects comprising records of customers' voice calls, customers' text chats, and customers' online interactions, respectively, which may be associated with one or more data sets.

Alternatively, or in addition, any one or more of devices 131-134 may comprise an interactive voice response system (IVR) system, a web server providing automated customer service functions to subscribers, etc. In such case, DB(s) 136 may similarly maintain records of customer, user, and/or subscriber interactions with such automated systems (e.g., as one or more data objects, such as tables, and/or as columns within one or more tables). The records may be of the same or a similar nature as any records that may be stored regarding communications that are handled by a live agent. Similarly, any one or more of the devices 131-134 may comprise a device deployed at a retail location that may service live/in-person customers. In such case, the one or more of devices 131-134 may generate records that may be forwarded and stored by DB(s) 136. The records may comprise purchase data, information entered by employees regarding inventory, customer interactions, surveys responses, the nature of customer visits, etc., coupons, promotions, or discounts utilized, and so forth. In still another example, any one or more of the devices 111-113 or 121-123 may comprise a device deployed at a retail location that may service live/in-person customers and that may generate and forward customer interaction records to DB(s) 136. The records may be maintained as one or more data objects, such as data objects that contain records for different time blocks (e.g., different data objects for different days' records), data objects that contain records from different locations (e.g., a first data object may comprise a first table that stores records from a first retail location, while a second data object may comprise a second table that stores records from a second retail location, and so forth).

Thus, the various data and/or records collected from various components of telecommunication service provider network 150 (e.g., server(s) 155), access networks 110 and 120, and/or service network 130 may be organized into and referred to as "data objects." This includes both "streaming" and "batch" data, or both "data at rest" and "data in motion." In one example, the data objects may be collected as one or more "data sets" or may be assigned to/associated with one or more data sets as received. Alternatively, or in addition, data objects may be assigned to one or more data sets after being received at DB(s) 136.

In one example, DB(s) 136 may alternatively or additionally receive and/or store data from one or more external entities. For instance, DB(s) 136 may receive and store weather data or traffic data from a device of a third-party, e.g., a weather service, a traffic management service, etc. via one of the access networks 110 or 120. To illustrate, one of the endpoint devices 111-113 or 121-123 may represent a weather data server (WDS). In one example, the weather data may be received via a weather service data feed, e.g., an NWS extensible markup language (XML) data feed, or the like. In another example, the weather data may be obtained by retrieving the weather data from the WDS. In one example, DB(s) 136 may receive and store weather data from multiple third-parties. In still another example, one of the endpoint devices 111-113 or 121-123 may represent a server of a traffic management service and may forward various traffic related data to DB(s) 136, such as toll payment data, records of traffic volume estimates, traffic signal timing information, and so forth. Similarly, one of the endpoint devices 111-113 or 121-123 may represent a server of a bank, an insurance entity, a medical provider, a consumer credit entity (e.g., a credit bureau, a credit card company, etc.), a merchant, or the like. In such an example, DB(s) 136 may obtain one or more data sets comprising information such as: consumer credit scores, credit reports, purchasing information and/or credit card payment information, credit card usage location information, and so forth (e.g., as one or more data objects, such as tables, table columns, etc.). Alternatively, or in addition DB(s) 136 may receive the same or similar data as one or more data feeds, which may be organized into one or more data sets comprising one or more data objects to be stored by DB(s) 136. In one example, one of the endpoint devices 111-113 or 121-123 may represent a server of an online social network, an online gaming community, an online news service, a streaming media service, or the like. In such an example, DB(s) 136 may obtain one or more data sets/data feeds comprising information such as: connections among users, specific media or types of media accessed, the access times, the durations of media consumption, games played, durations of game play, and so forth. It should be noted that for all of the above examples, the data, records, or other information collected from external entities may also be organized into and referred to as "data objects." In one example, the data objects may be received as one or more "data sets," or may be assigned to one or more data sets after being received at DB(s) 136.

In accordance with the present disclosure, DB(s) 136 may further store metadata associated with various data sets, data schema(s) (e.g., for data formatting, data naming, data size, etc.), and so forth. In one example, the metadata may include profiles of data sets (which may include profiles of data objects of the data sets). For instance, a profile of a data object may comprise the characteristics thereof, such as for a data column, a data type of the column, a mean of the column values, a median, a standard deviation, a high value, a low value, a uniqueness metric, and so forth. In addition, with respect to all of the above examples, it should be noted that the data sets and/or data objects of data sets may be accessed by server(s) 135 and/or DB(s) 136 via application programming interfaces (API) or other access mechanisms between computing systems, and may include data that is specifically formatted and/or processed so as to maintain user privacy and/or anonymity, and/or such that the data that is accessed is in accordance with user-granted permissions, preferences, or the like, as well as any applicable contractual, legal, and/or regulatory obligations of either the provider(s) of such data, and/or the operator of server(s) 135 and/or DB(s) 136, as an accessor of the data.

In accordance with the present disclosure, DB(s) 136 may further store a catalog of visual objects and/or a library of abstract visual representations (e.g., visual objects that have been labeled with data objects of a data set). For instance, a catalog may include representative visual objects of various categories, such as machinery/mechanical systems, which may be further divided into sub-categories of transportation systems/vehicles, appliances, exercise equipment, etc., landscape items, which may be divided into sub-categories of plants, landscapes/panoramas, etc. A library may essentially comprise templates of visual representations for representative data sets.

In accordance with the present disclosure, DB(s) 136 may also store machine learning algorithms (MLAs) and/or trained MLAs, e.g., MLMs that are trained with training data for various purposes, such as prediction, classification, etc. For instance, DB(s) 136 may store a generative machine learning model (MLM), one or more classifiers (e.g., a support vector machine (SVM) or the like) to determine relationships between data objects, and so forth. It should be noted that as referred to herein, a machine learning model (MLM) (or machine learning-based model) may comprise a machine learning algorithm (MLA) that has been "trained" or configured in accordance with input training data to perform a particular service. For instance, an MLM may comprise a deep learning neural network, or deep neural network (DNN), a convolutional neural network (CNN), a generative adversarial network (GAN), a decision tree algorithm/model, such as gradient boosted decision tree (GBDT) (e.g., XGBoost, XGBR, or the like), a support vector machine (SVM), e.g., a non-binary, or multi-class classifier, a linear or non-linear classifier, k-means clustering and/or k-nearest neighbor (KNN) predictive models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs, or other generative and/or classification models may be implemented in examples of the present disclosure.

In accordance with the present disclosure, a generative MLM may include an RNN, an LSTM network, a transformer network, an encoder-decoder neural network, an encoder neural network, a decoder neural network, a variational autoencoder, a GAN, or the like, where the input data comprises a data set (e.g., the component data objects, the profiles of the data objects, and the relationships between the data objects) and the output is a labeled visual object (e.g., a visual representation of the data set).

In accordance with the present disclosure, one or more classifiers may be used to automatically determine relationships between data objects in a data set. In other words, the one or more classifiers may be applied during a data profiling phase to determine whether the data object is a subset of another data object, whether the data object contains another data object therein, when the data object comprises data that overlaps with another data object, whether the data object is complementary to another data object (e.g., has the same rows, but different columns), whether the data object is correlated to another data object, and so forth. The classifier(s) may use the individual profiles of data objects to infer one or more types of relationships (e.g., where the profiles may include characteristics of the data objects, such as mean, median, highest value, lowest value, uniqueness, null count, etc.). The classifiers may comprise, for example, a binary classifier or multi-class classifier, a linear or non-linear classifier, k-means clustering and/or KNN predictive classifier, a decision tree-base classifier, and so forth.

Figure 3:
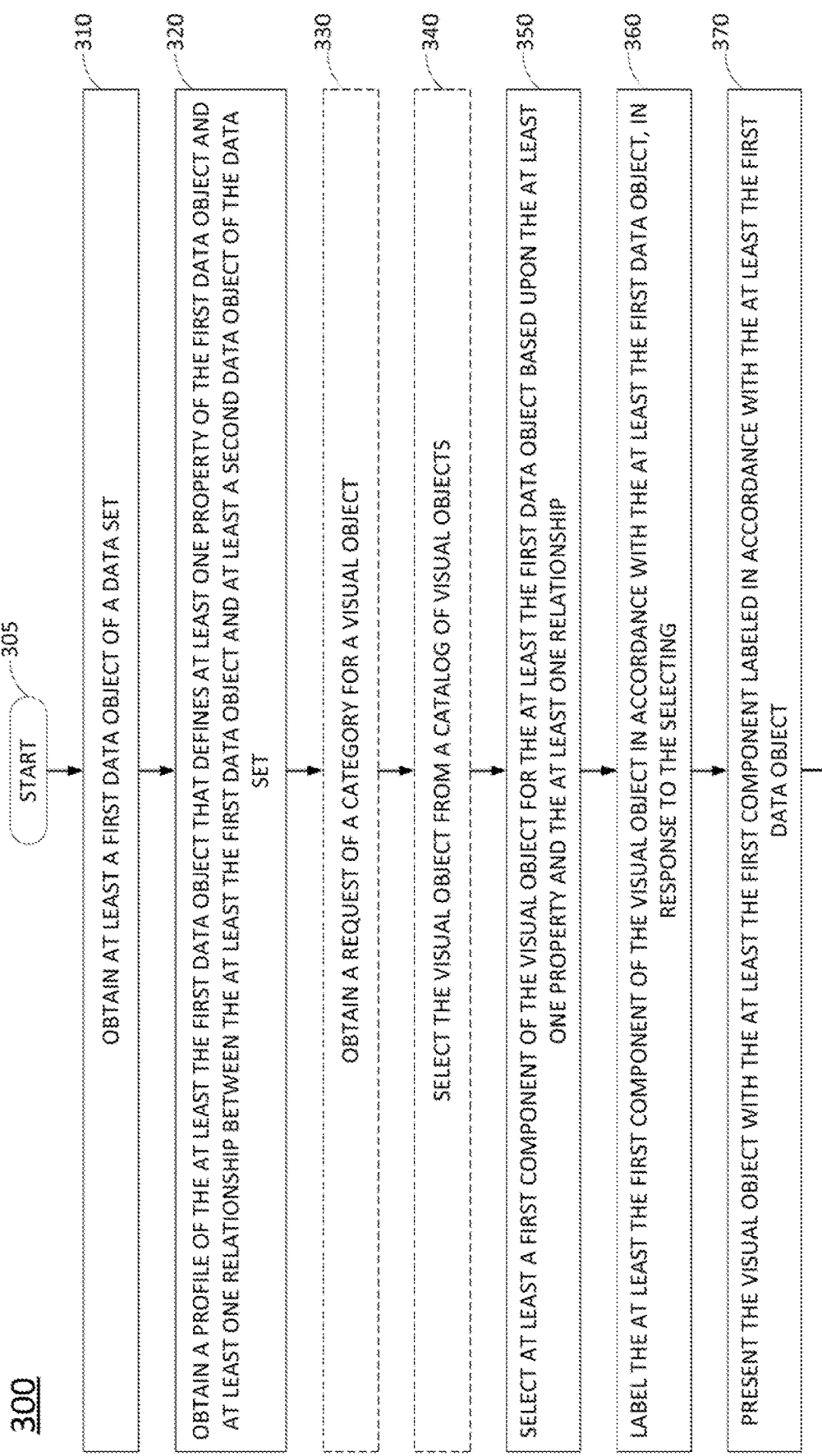
FIG. 3 illustrates a flowchart of an example method for presenting a visual object with components labeled with data objects of a data set.

In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like. As noted above, in one example, one or more of servers 135 may comprise a processing system that is configured to perform operations for presenting a visual object with components labeled with data objects of a data set, as described herein. For instance, a flowchart of an example method 300 for presenting a visual object with components labeled with data objects of a data set is illustrated in FIG. 3 described in greater detail below.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth. Thus, these and other modifications are all contemplated within the scope of the present disclosure.

Figure 2:
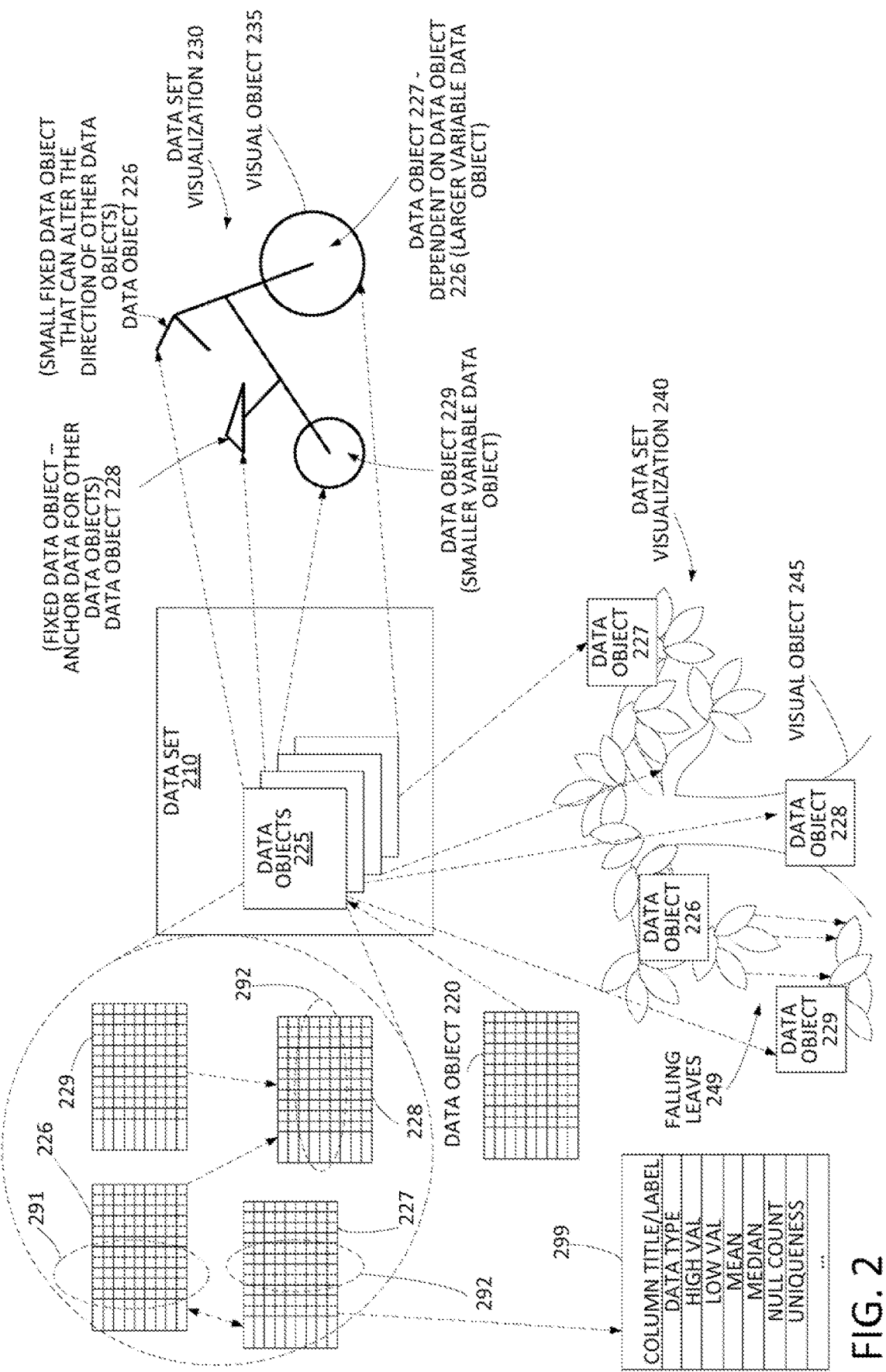
FIG. 2 illustrates examples of generating visual representations of a data set, in accordance with the present disclosure.

FIG. 2 illustrates examples of generating visual representations of a data set, in accordance with the present disclosure. As illustrated in FIG. 2, a data set 210 may comprise a plurality of data objects 225. The data objects 225 may include data objects 226-229 (e.g., data tables). For illustrative purposes, relationships between the data objects 225 are shown in FIG. 2. For instance, data object 226 may have the same key as data object 227, with some overlapping data (e.g., same columns), but with some non-overlapping data (e.g., columns 291 and 292 may be unique to data objects 226 and 227, respectively). In other words, data objects 226 and 227 may be complementary to each other (e.g., each has a "complementary-to" relationship with the other). In addition, data object 229 may be a subset of data object 228 (e.g., indicated by rows 292 of data object 228). Moreover, data object 226 may have some entries (e.g., rows) that correspond to entries in data object 228. For instance, a last column of a table of data object 226 may comprise keys/pointers to corresponding rows of data object 228. It should be noted that the data objects 225 may each include a profile, e.g., as metadata stored in connection with the respective data objects. For instance, a profile of a data object may include a number of column properties, such as column properties 292 of a representative column of data set 227, which may include: the column title/label, a data type of the data in the column, a high value (val) of the data in the column, a low value, a mean of the values, a median of the values in the column, a null count (e.g., a number of entries in the column that are empty), a uniqueness (e.g., a count of the number of unique values in the column), and so forth. Other types of properties may include an entropy metric, a completeness metric, a distinctness metric, a standard deviation, etc., and for a data object overall, a number of rows, a number of columns, a number of data values, and so forth. Metadata/data object profiles may also include provenance information (e.g., a source data object, or data objects, of a given data object and/or at least one column therein), manual labels (such as, "data object comprises aggregated daily metrics from data object XYZ"), and so forth.

In one example, data objects 225 may already possess profiles when the data set 210 is accessed by a processing system of the present disclosure. For instance, one or more different processing systems may have performed an ETL process and/or a data profiling process such that all or some of the data objects 225 may possess metadata comprising characteristics/properties of the respective data objects 225. Alternatively, or in addition, one or more of the data objects 225 may be ingested into the data set 210, where the ingestion may include an ETL process and/or a data profiling process in order to populate metadata of the respective data objects 225, e.g., with respective profiles. In one example, the data profiling may include automatically identifying relationships between data objects 225 (e.g., via one or more classifiers). It should be noted that for illustrative purposes, data objects 225 are depicted and described as data tables having profiles comprised of column properties. However, it should be understood that in other, further, and different examples, a data object may comprise a vector of values (such as a sequential list of mobile device location data, a peak number of endpoint devices connected to a cellular base station in successive five minute intervals, etc.), all or a portion of a graph (e.g., a graph database) or the like.

In a first example, a visual representation of data set 210 (e.g., data set visualization 230) may be generated based upon the data objects 225 (e.g., the particular data objects 226-229), the profiles of the data objects 225 (e.g., the characteristics of the data therein), and the relationships of data objects 225 among each other. In accordance with the present disclosure, the visual object 235 may be selected as the basis for the visualization 230 in one of several ways. For instance, the data set 210 may be determined to be "similar" to a second data set for which a data set visualization comprising the visual object 235 may have previously been utilized. To illustrate, the similarity may be quantified, e.g., as a "correspondence metric," wherein the correspondence metric may be based upon a matching between data objects 225 of the data set 210 and data objects of the second data set. For instance, the matching may be based upon properties of the data objects 225 of the data set 210 and properties of the data objects of the second data set (e.g., contained in the respective profiles thereof), and correspondence of relationships between the data objects 225 of the data set 210 among each other and relationships between the data objects of the second data set among each other. For instance, when a data object from the data objects 225 comprise the same or similar profile as a data object from the second data set, the two data objects may be considered as the same or analogous. The greater the number of matching properties, the greater the similarity of the two data objects (and hence which may contribute more positively to the "correspondence metric"). In addition, when two data objects of data objects 225 have a relationship to each other that is the same or similar to a relationship between analogous data objects of the second data set, this may contribute positively to the correspondence metric.

In one example, a correspondence metric may be calculated between data set 210 and a plurality of other data sets for which visualizations were previously generated (e.g., and stored in a visualization library). In one example, the corresponding visual object of a data visualization associated with one of the other data sets with a highest correspondence metric may be selected for use in generating the visualization 230 of data set 210 (e.g., visual object 235). Alternatively, or in addition, visual objects from the top matching data sets according to correspondence metrics may be presented for a user selection (e.g., the top three matches, the top five matches, etc.). For instance, the visual object 235 may be selected by a user in accordance with such a choice.

In one example, the components of the visual object 235 may be labeled with corresponding data objects of the data objects 225. For instance, data objects of data objects 225 that are determined to be analogous to data objects of the second data set may be placed in the same locations (e.g., associated with the same components) of the visual object 235 as the analogous data objects of the second data set according to a previous visual representation stored in a library. For example, FIG. 2 illustrates that a seat of a bicycle may be labeled with data object 228 (which may comprise a fixed data object that functions as anchor data for others of the data objects 225). Similarly, the handlebars may be labeled with data object 226 (which may comprise a small fixed data object that can alter the directions of other data objects). Wheels of the bicycle may be labeled with data objects 227 (e.g., a larger variable data object) and data object 229 (e.g., a smaller variable data object), respectively. In one embodiment, the visual object 235 (the bicycle in this instance) can be animated, e.g., the wheels can be shown spinning as the data size or volume grows or drops, the direction or a path of the bicycle can be altered as the data changes, the speed or acceleration of the bicycle can be altered as the data changes, and the like.

In another example, the visual object 235 may be selected for the data set 210 in a different way. For instance, the visual object 235 may be selected based on a correspondence metric between the visual object 235 and data objects 225 of the data set 210 (e.g., properties of the data objects 225 and relationships between the data objects 225). For example, the visual object 235 may be tagged with associations of components of the visual object 235 (e.g., seat, handlebars, wheels, etc.) to data set property types and data set relationship types (e.g., properties of data objects of data sets and relationships between such data objects). In one example, associations of components to data set relationship types may comprise associations of component pairs with the relationship type(s) (e.g., handlebars to wheels, seat to chassis, etc.). In such case, the correspondence metric may be based on a quantity of matching of the data set property types associated with the components of the visual object 235 and the properties of the data objects 225 of the data set 210, and a quantity of matching of the data set relationship types associated with the components of the visual object 235 and the relationships between the data objects 225 of the data set 210.

In one example, the visual object 235 may be manually tagged with the associations. Alternatively, or in addition, the visual object may be automatically tagged with the associations in accordance with a tagging process. For instance, a user may have created a visualization for another data set comprising a labeled instance of visual object 235. A tagging process may then identify the properties of the data objects that are used for the labels, and may then tag the components of the visual object 235 with one or more properties of the associated data set (and similarly to define relationship types for pairs of components of the visual object 235). In one example, this may be refined by subsequent uses of the same visual object 235 for different data sets. For instance, a component of the visual object 235 may first be tagged with all properties of a data object. However, when the component is subsequently assigned to/used for a different data object from a different data set, the component of the visual object 235 may be tagged with overlapping/common/shared properties of the two data sets. Other properties may be omitted from the tagging. Then, when the visual object 235 is considered for data set 210 in an automated fashion in accordance with the present disclosure, the correspondence metric may only take into account a matching with the tagged property (or properties). For illustrative purposes, it may be assumed that data set 210 is matched to the visual object 235 and that the visualization 230 may be generated by labeling the visual object 235 in the same or a similar manner as described above.

In still another example, the visual object 235 (and the visualization 230) may be generated via a generative machine learning model (MLM). For instance, inputs of the generative MLM may comprise data objects 225 of the data set 210, properties of the data objects 225, and relationships between the data objects 225. The output of the generative MLM may comprise the visual object 235 with labels of components of the visual object 235 in accordance with at least a portion of the data objects 225 of the data set 210. In one example, the output of the generative MLM may comprise the visual object 235 with labels of relationships between the data objects 225 of the data set 210. For instance, in the example of FIG. 2, data object 227 may be indicated as "dependent on data object 226" (which is represented by the handlebars, symbolizing that data object 226 may alter the direction of other data objects, such as data object 227). It should be noted that not necessarily all of the data objects 225 may be represented, since the abstraction of visual object 235 may not cover all data objects 225, or some data objects 225 may be deemed insignificant and not included in the visualization 230. In one example, omissions may be learned from training examples in which users have manually omitted certain aspects of other similar data sets from the respective visualizations. In one example, as noted above, the generative MLM may be trained with training data comprising pairs of example data sets and associated visualizations (e.g., labeled visual objects).

To further illustrate aspects of the present disclosure, FIG. 2 also includes a second data set visualization 240 comprising visual object 245 (e.g., a tree with leaves). For instance, a user may have selected an option to utilize a visual object from a particular category (e.g., landscape/nature items). As such, a processing system of the present disclosure may omit from consideration visual objects from other categories (and hence would not select visual object 235 comprising a vehicle). Notably, visual object 245 and data set visualization 240 may comprise an alternate way to visually represent the data set 210. As in the example(s) relating to data set visualization 230 and visual object 235, the visual object 245 may be selected in accordance with a correspondence metric between data set 210 and the visual object 245 and/or another data set that is associated with visual object 245. Alternatively, or in addition, visualization 240 may comprise an output of a generative MLM (e.g., where the inputs may comprise data objects 225 of the data set 210, properties of the data objects 225, and relationships between the data objects 225). In one example, the inputs may further include a selection of a category, or a description of a desired visual object (e.g., "represent data set 210 as a tree with leaves"). In such case, the generative MLM may be trained on input data comprising natural language features as well as the profiles/properties/characteristics of data sets and corresponding visualizations.

In the example of FIG. 2, data object 228 may be represented by the trunk of the tree. Data object 227 may be represented by a portion of the branches. Data object 226 may be represented by another portion of the branches. Lastly, data object 229 may be represented by fallen leaves. For instance, data object 225 of data set 210 may include respective data objects for phone numbers and other fixed (or relatively fixed) user data, call logs, text message logs, online interaction logs, and call failure events pertaining to each communication type (call, text, online web browsing). In this case, the trunk of the tree may represent the phone numbers (e.g., data object 228), each branch may represent a connection type (e.g., data objects 226 and 227), and the fallen leaves may represent call/connection failures.

In one example, different colored leaves may represent different failure types (e.g., failed voice calls, failed text messages, etc.). In addition, in one example, the visual object 245 may comprise an animated image. For instance, the visual object 245 may present a loop of falling leaves 249. It should be noted that the feature/component of visual object 245 comprising falling leaves 249 may be tagged as being representative of call failures in the context of one or more other data sets (e.g., that have previously been represented by visual object 245). Then, when analyzing data set 210, visual object 245 may be selected and the falling leaves 249 assigned to data objects for call failures (which may be determined to be similar to the data object(s) of call failures previously represented by the falling leaves 249 for the one or more other data sets). Alternatively, a generative MLM may uncover similarities between data object 229 representing call failures and data objects representing call failures from existing data sets. Then, when generating visual object 245, falling leaves 249 may be included that may be the same or similar to failing leaves that represented call failures in one or more other visualizations for prior data sets.

It should be noted that FIG. 2 and the foregoing description relates to representative examples and that other, further, and different configurations, or other components or features may be provided in accordance with the present disclosure. As just one example, a revised visualization may be generated when a data set, such as data set 210, is updated. For instance, data set 210 may receive a new data object 220 that may have some relation to one or more existing ones of the data objects 225. In this case, a processing system of the present disclosure may update a visual representation to account for the new data object. For instance, a label for the small wheel of the bicycle (visual object 235) may be updated to represent both data object 229 and the new data object 220. In another example, the visualization 230 may include unassigned components of the visual object 235. As such, an available component may be assigned to and labeled with the data object 220. Alternatively, or in addition, a new visual object may be selected and labeled, such as a three-wheeled vehicle that may include another wheel to represent data object 220 or a bicycle basket to represent data object 220. In still another example, where a generative MLM is used, the generative MLM may be re-run with the updated data set 210 as an input. The output may be a visual object that is similar to visual object 235, but that better accounts for the inclusion of data object 220 (e.g., its profile/properties, relationships, etc.). For instance, the generative MLM may output a three-wheeled vehicle in response to the updated data set 210 as input. Thus, these and other modification are all contemplated within the scope of the present disclosure.

FIG. 3 illustrates a flowchart of an example method 300 for presenting a visual object with components labeled with data objects of a data set, according to the present disclosure. In one example, the method 300 is performed by a component of the system 100 of FIG. 1, such as by server(s) 135, and/or any one or more components thereof (e.g., a processor, or processors, performing operations stored in and loaded from a memory or distributed memory system), or by server(s) 135, in conjunction with one or more other devices, such as DB(s) 136, server(s) 155, and so forth. In one example, the steps, functions, or operations of method 300 may be performed by a computing device or processing system, such as computing system 400 and/or a hardware processor element 402 as described in connection with FIG. 4 below. For instance, the computing system 400 may represent at least a portion of a platform, a server, a system, and so forth, in accordance with the present disclosure. In one example, the steps, functions, or operations of method 300 may be performed by a processing system comprising a plurality of such computing devices as represented by the computing system 400. For illustrative purposes, the method 300 is described in greater detail below in connection with an example performed by a processing system (e.g., deployed in a telecommunication network). The method 300 begins in step 305 and proceeds to step 310.

At step 310, the processing system obtains at least a first data object of a data set. In one example, step 310 may comprise obtaining the data set including the at least the first data object and at least the second data object. For instance, in one example, the first data object may be obtained as a new data object to be added to an existing data set. In another example, the data set may be obtained where the first data object is already part of the data set. As discussed above, the at least the first data object may comprise a data table, a data vector, or a data record. It should be noted that a vector may comprise a column or a row of a data table, or may be a distinct data structure. Similarly, a data record may refer to a row of data table, an entire data table, or a distinct data structure. In one example, a data object may comprise a graph database, a node of a graph database, or a portion of a graph database (e.g., a plurality of nodes and edges). In one example, a node of a graph database may also comprise a data table, a data vector, or a data record.

At step 320, the processing system obtains a profile of the at least the first data object. For instance, the profile may define at least one property of the first data object and at least one relationship between the at least the first data object and at least a second data object of the data set. In one example, the profile may be included as metatdata of the first data object (and/or as metadata of another data structure in which the data object is contained). In one example, step 320 may comprise applying at least one data profiling operation to the first data object. For instance, an output of the at least one data profiling operation may comprise the at least one property of the first data object and/or at least one relationship between the at least the first data object and the at least a second data object of the data set. To illustrate, the at least one data profiling operation may include calculating one or more properties such as mean, median, standard deviation, entropy metric, and so forth with respect to the first data object (and/or with respect to a row, column, subset or other sub-unit of the first data object (depending upon the type of data object). In this regard, the at least one property may comprise, for example: a completeness metric. a distinctness metric, an entropy metric, a uniqueness metric, a mean, a median, a standard deviation, a maximum value, a minimum value, a number or rows, a number of columns, a number of data values, and so forth.

Similarly, the at least one relationship may be at least one defined relationship type, which may include: a subset-of relationship type, a contains-within relationship type, an overlapping-with relationship type, a derived-from relationship type, a complement-to relationship type, a correlated-with relationship type, or the like. In one example, step 320 may include determining the at least one relationship, such as via application of one or more classifiers as described above. Alternatively, or in addition, for a relational database, the data may be in tables and/or columns, and the at least the first data object may be associated with the at least the second data object (e.g., there is a relationship of a defined relationship type between the at least the first data object and the at least the second data object). This may be indicated by one or more joins and/or in accordance with one or more index tables containing one or more relationships and/or in accordance with a database schema over the entire database (e.g., the entire data set), entries in a relationship column/lookup column appended to a data object comprising a table/vector, or the like. For a graph database, the at least one relationship may be indicated by the position of a node representing the first data object in the graph and the edges between the node and other nodes (e.g., the relationships are inherent in the graph format). However, if the first data object is a new data object to be added to the data set (e.g., the overall graph), one or more classifiers may be applied to the new data object to determine one or more properties and one or more relationships. The new data object may then be added to the graph in accordance with the one or more properties and one or more relationships. In one example, step 320 may further include tagging/labeling the at least the first data object with the at least one property and/or the at least one relationship that is determined, e.g., as metadata of the first data object to be stored along with the data of the data object.

At optional step 330, the processing system may obtain a request of a category for the visual object, where the visual object is selected from among a plurality of categories of visual objects in a catalog in accordance with the category that is requested. For instance, visual objects may be of various categories such as machinery/mechanical systems, which may be further divided into sub-categories of transportation systems/vehicles, appliances, exercise equipment, etc., landscape items, which may be divided into sub-categories of plants, landscapes/panoramas, etc., and so forth.

At optional step 340, the processing system may select the visual object from the catalog of visual objects. For instance, in one example, the visual object may be selected based on a correspondence metric between the data set and a second data set that is associated with the visual object. To illustrate, the correspondence metric may be based upon a matching of data objects of the data set and data objects of the second data set (e.g., between properties of the data objects of the data set and properties of the data objects of the second data set) and upon a matching of relationships between the data objects of the data set and relationships between the data objects of the second data set (e.g., relationships of the same relationship type and between data objects having the same or similar properties). It should be noted that data objects may be "similar" when the data objects have greater than a threshold percentage of properties that are the same. Alternatively, or in addition, the data objects may be "similar" when an overall matching score between data objects exceeds a threshold. It should be noted that similarity is not necessarily quantified based on an exact correspondence of properties. Rather, in some cases, there may be a degree of matching, e.g., based upon how close the mean, median, and standard deviations values of data of a same data type in the two data objects match each other, and so forth. In addition, an overall correspondence score between two data sets may be built upon an aggregation of matching scores among similar data of the respective data objects (as well as the presence of the same or similar relationships among the same or similar data objects). In any case, when the second data set is determined to be matched to the data set, a visual object associated with the second data set may thus be selected. For instance, correspondence metrics between the data set and a plurality of other data sets may be calculated, and the top matching one of the other data sets may be identified for selection of the corresponding visual object. Alternatively, or in addition, a number of top matching sets may be identified and the corresponding visual objects presented for selection. In such case, optional step 340 may include obtaining a user choice of the visual object.

In another example, the visual object may be selected at optional step 340 based on a correspondence metric between the visual object and data objects of the data set, properties of the data objects, and relationships between the data objects. For instance, the visual object may be tagged with associations of components of the visual object to data set property types and data set relationship types. Accordingly, in such an example, the correspondence metric may be based on a quantity of matching of the data set property types associated with the components of the visual object and the properties of the data objects of the data set, and a quantity of matching of the data set relationship types associated with the components of the visual object and the relationships between the data objects of the data set.

As noted above, the visual object may be manually tagged with the associations and/or the visual object may be automatically tagged with the associations in accordance with a tagging process. For instance, a user may have created a visualization for another data set comprising a labeled instance of the visual object. A tagging process may then identify the properties of the data objects that are used for the labels, and may then tag the components of the visual object with one or more properties of the associated data set (and similarly to define relationship types for pairs of components of the visual object). In one example, this may be refined by subsequent uses of the same visual object 235 for different data sets. As in the preceding example, correspondence metrics between the data set and a plurality of visual objects may be calculated, and the top matching one of the visual objects may be identified for selection at optional step 340. Alternatively, or in addition, a number of top matching visual objects may be identified and presented for selection. In such case, optional step 340 may include obtaining a user choice of the visual object.

At step 350, the processing system selects at least a first component of the visual object for the at least the first data object based upon the at least one property and the at least one relationship. For instance, a component of the visual object may be associated with a data object from a second data set that is determined to be similar/analogous to the first data object. As such, the first data object may be associated with the same component of the visual object in this case. In one example, this may be repeated for other data objects of the data set and other components of the visual object. Alternatively, the first data object may be a new data object to be added to an existing data set, where a visual representation of the data set is already created, and a new label for the new data object is to be added to the visual object. In another example the first data object may be matched to the component of the virtual object via step 340 above (e.g., by matching of the data set property types associated with the components of the visual object and the properties of the data objects of the data set).

At step 360, the processing system labels the at least the first component of the visual object in accordance with the at least the first data object, in response to the selecting. For instance, the labeling may be such as illustrated in the examples of FIG. 2, e.g., overlay text, a text box with an arrow to the corresponding component of the visual object, and so forth. In one example, the type of labeling may be selected by a user, and implemented by the processing system at step 360. In one example, the labeling may include simply the name or identifier of the data object. In another example, the labeling may include additional details, such as one or more properties from a profile of the first data object (e.g., a date range of the data, a date at which the data object was "finalized" or "last modified," one or more data types, an identifier of a source of the data of the first data object (e.g., New York data center, Atlanta data center, or the like), and so forth).

In one example, the visual object may be a generative visual object, e.g., an output of a generative MLM. For instance, in one example, the selecting at step 350 of the at least the first component of the visual object for the at least the first data object and the labeling of step 360 may comprise generating the visual object via the generative MLM. For instance, as discussed above, inputs of the generative MLM may comprise data objects of the data set, properties of the data objects, and relationships between the data objects. An output of the generative MLM may comprise the visual object. In one example, the output may comprise the visual object with first labels of components of the visual object in accordance with at least a portion of the data objects of the data set. In one example, the output of the generative MLM may further comprise the visual object with second labels of relationships between the at least the portion of the data objects of the data set. In one example, the generative MLM may be trained with training data comprising pairs of example data sets and associated visual objects. In one example, the visual objects of the training data may be labeled with data objects of the respective data sets. In one example, the visual objects of the training data may be further labeled with relationships of data objects of the respective data sets.

It should be noted that the first labels may not necessarily be for all of the data objects, and/or the second labels may not necessarily be for all relationships of the data set. In particular, the abstraction of the visual object may not cover all data objects, or some data objects may be deemed insignificant and not included in the visualization (and likewise for some relationships), which may be incorporated into the generative MLM learning from training examples in which users have manually omitted certain aspects of other similar data sets from the visualization, for which user have given feedback with respect to prior generative visual objects/visualizations in which users have modified the results to exclude certain data objects that were included by the generative MLM, and so forth.

At step 370, the processing system presents the visual object with the at least the first component labeled in accordance with the at least the first data object. For instance, the visual object with the at least the first component labeled in accordance with the at least the first data object may comprise a visualization of the data set, which may be presented/displayed via a display screen of the processing system or associated with the processing system. Alternatively, or in addition, in one example, step 370 may include transmitting the visualization to an endpoint device for presentation, e.g., a user endpoint device. In one embodiment, the presentation may include an animation of the visual object.

Following step 370, the method 300 proceeds to step 395 where the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 310-370 for additional data objects to be added to the data set, steps 310-370 for additional data sets, and so forth. In one example, the method 300 may include revising a visualization of the data set, such as updating the visual object labels, selecting a new visual object to represent new and/or changing characteristics of a data set base upon addition of new data objects (or removal of data objects). In one example, the method 300 may be expanded to include generating a new generative visual object to better represent the updated data set, and so forth. In one example, the method 300 may be expanded to include training a generative MLM. For instance, the method may include receiving training examples comprising pairs of example data sets and associated visual objects, and training the generative MLM in accordance with the training examples. In one example, the method 300 may additionally include retraining the generative MLM. For instance, retraining may be based upon user feedback (e.g., a reinforcement learning (RL) framework), such as changing the labels of visual object components, omitting labels that were added by the generative MLM automatically, etc. Similarly, in another example, the method 300 may include obtaining user feedback changing tags of visual object components and updating the visual objects in a library of visual objects. In one example, the method 300 may be expanded or modified to include steps, functions, and/or operations, or other features described above in connection with the example(s) of FIGS. 1 and 2, or as described elsewhere herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

Figure 4:
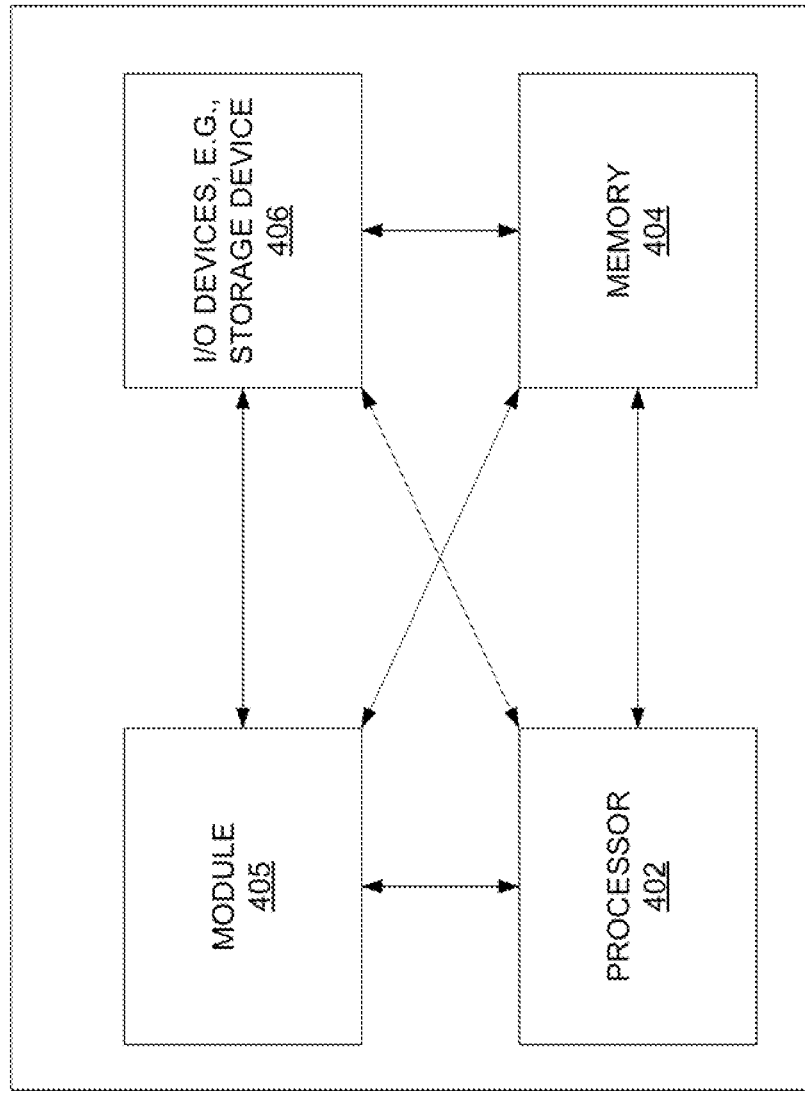
FIG. 4 illustrates a high-level block diagram of a computing device specially programmed to perform the functions described herein.

FIG. 4 depicts a high-level block diagram of a computing system 400 (e.g., a computing device or processing system) specifically programmed to perform the functions described herein. For example, any one or more components, devices, and/or systems illustrated in FIG. 1 or FIG. 2, or described in connection with FIG. 3, may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where the hardware processor element 402 may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for presenting a visual object with components labeled with data objects of a data set, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, the computing system 400 may employ a plurality of hardware processor elements. Furthermore, although only one computing device is shown in FIG. 4, if the method(s) as discussed above is implemented in a distributed or parallel manner for a particular illustrative example, e.g., the steps of the above method(s) or the entire method(s) are implemented across multiple or parallel computing devices, then the computing system 400 of FIG. 4 may represent each of those multiple or parallel computing devices. Furthermore, one or more hardware processor elements (e.g., hardware processor element 402) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 405 for presenting a visual object with components labeled with data objects of a data set (e.g., a software program comprising computer-executable instructions) can be loaded into memory 404 and executed by hardware processor element 402 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 402) executing the computer-readable instructions relating to the above described method(s) can be perceived as a programmed processor or a specialized processor. As such, the present module 405 for presenting a visual object with components labeled with data objects of a data set (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
   obtaining, by a processing system including at least one processor, at least a first data object of a data set;
   obtaining, by the processing system, a profile of the at least the first data object, wherein the profile defines at least one property of the first data object and at least one relationship between the at least the first data object and at least a second data object of the data set;
   selecting, by the processing system, at least a first component of a visual object for the at least the first data object based upon the at least one property and the at least one relationship;
   labeling, by the processing system, the at least the first component of the visual object in accordance with the at least the first data object, in response to the selecting, wherein the visual object is generated via a generative machine learning model, wherein the selecting of the at least the first component of the visual object for the at least the first data object and the labeling comprise generating the visual object via the generative machine learning model, wherein inputs of the generative machine learning model comprise data objects of the data set, properties of the data objects, and relationships between the data objects, and wherein an output of the generative machine learning model comprises the visual object with first labels of components of the visual object in accordance with at least a portion of the data objects of the data set; and
   presenting, by the processing system, the visual object with the at least the first component labeled in accordance with the at least the first data object.

2. The method of claim 1, wherein the obtaining of the at least the first data object comprises:
   obtaining the data set including the at least the first data object and the at least the second data object.

3. The method of claim 1, further comprising:
   selecting the visual object from a catalog of visual objects.

4. The method of claim 3, wherein the visual object is selected based on a correspondence metric between the data set and a second data set that is associated with the visual object.

5. The method of claim 4, further comprising:
   obtaining a request of a category for the visual object, where the visual object is selected from among a plurality of categories of visual objects in the catalog of visual objects in accordance with the category that is requested.

6. The method of claim 3, wherein the visual object is selected based on a correspondence metric between the visual object and data objects of the data set, properties of the data objects, and relationships between the data objects.

7. The method of claim 6, wherein the visual object is tagged with associations of components of the visual object to data set property types and data set relationship types.

8. The method of claim 7, wherein the correspondence metric is based on a quantity of matching of the data set property types associated with the components of the visual object and the properties of the data objects of the data set, and a quantity of matching of the data set relationship types associated with the components of the visual object and the relationships between the data objects of the data set.

9. The method of claim 8, wherein:
the visual object is manually tagged with the associations; or
the visual object is automatically tagged with the associations in accordance with a tagging process.

10. The method of claim 1, wherein the output of the generative machine learning model comprises the visual object with second labels of relationships between the at least the portion of the data objects of the data set.

11. The method of claim 1, wherein the generative machine learning model is trained with training data comprising pairs of example data sets and associated visual objects.

12. The method of claim 1, wherein the at least the first data object comprises:
a data table;
a data vector; or
a data record.

13. The method of claim 1, wherein the obtaining of the profile of the at least the first data object comprises:
applying at least one data profiling operation to the first data object, wherein at least one output of the at least one data profiling operation comprises the at least one property of the first data object or the at least one relationship between the at least the first data object and the at least the second data object of the data set.

14. The method of claim 13, wherein the at least one property comprises, for the at least the data set, at least one of:
a completeness metric;
a distinctness metric;
an entropy metric;
a uniqueness metric;
a mean;
a median;
a standard deviation;
a maximum value;
a minimum value;
a number or rows;
a number of columns; or
a number of data values.

15. The method of claim 13, wherein the at least one relationship is of at least one defined relationship type, the at least one defined relationship type comprising at least one of:
a subset-of relationship type;
a contains-within relationship type;
an overlapping-with relationship type;
a derived-from relationship type;
a complement-to relationship type; or
a correlated-with relationship type.

16. A non-transitory computer-readable medium storing instructions which, when executed by a processing system including at least one processor, cause the processing system to perform operations, the operations comprising:
obtaining at least a first data object of a data set;
obtaining a profile of the at least the first data object, wherein the profile defines at least one property of the first data object and at least one relationship between the at least the first data object and at least a second data object of the data set;
selecting at least a first component of a visual object for the at least the first data object based upon the at least one property and the at least one relationship;
labeling the at least the first component of the visual object in accordance with the at least the first data object, in response to the selecting, wherein the visual object is generated via a generative machine learning model, wherein the selecting of the at least the first component of the visual object for the at least the first data object and the labeling comprise generating the visual object via the generative machine learning model, wherein inputs of the generative machine learning model comprise data objects of the data set, properties of the data objects, and relationships between the data objects, and wherein an output of the generative machine learning model comprises the visual object with first labels of components of the visual object in accordance with at least a portion of the data objects of the data; and
presenting the visual object with the at least the first component labeled in accordance with the at least the first data object.

17. A device comprising:
a processor system including at least one processor; and
a computer-readable medium storing instructions which, when executed by the processing system, cause the processing system to perform operations, the operations comprising:
obtaining at least a first data object of a data set;
obtaining a profile of the at least the first data object, wherein the profile defines at least one property of the first data object and at least one relationship between the at least the first data object and at least a second data object of the data set;
selecting at least a first component of a visual object for the at least the first data object based upon the at least one property and the at least one relationship;
labeling the at least the first component of the visual object in accordance with the at least the first data object, in response to the selecting, wherein the visual object is generated via a generative machine learning model, wherein the selecting of the at least the first component of the visual object for the at least the first data object and the labeling comprise generating the visual object via the generative machine learning model, wherein inputs of the generative machine learning model comprise data objects of the data set, properties of the data objects, and relationships between the data objects, and wherein an output of the generative machine learning model comprises the visual object with first labels of components of the visual object in accordance with at least a portion of the data objects of the data; and
presenting the visual object with the at least the first component labeled in accordance with the at least the first data object.

18. The device of claim 17, wherein the obtaining of the at least the first data object comprises:
   obtaining the data set including the at least the first data object and the at least the second data object.

19. The device of claim 17, wherein the operations further comprise:
   selecting the visual object from a catalog of visual objects.

20. The device of claim 19, wherein the visual object is selected based on a correspondence metric between the data set and a second data set that is associated with the visual object.

* * * * *